UNITED STATES PATENT OFFICE.

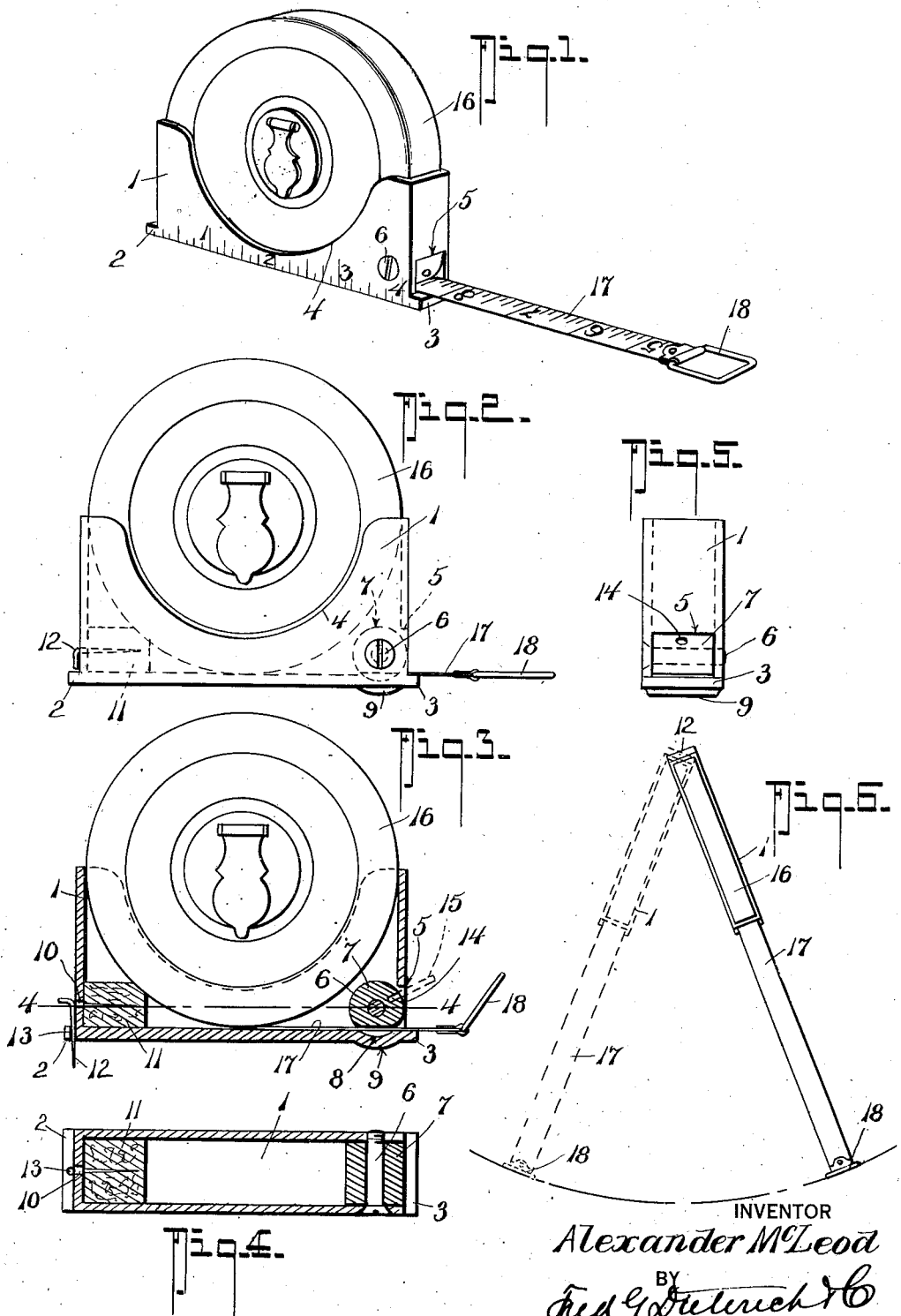

ALEXANDER McLEOD, OF PORTLAND, OREGON.

MEASURING DEVICE.

1,259,886.   Specification of Letters Patent.   Patented Mar. 19, 1918.

Application filed June 11, 1917. Serial No. 174,086.

*To all whom it may concern:*

Be it known that I, ALEXANDER MCLEOD, residing at Portland, in the county of Multnomah and State of Oregon, have invented certain new and useful Improvements in Measuring Devices, of which the following is a specification.

My invention is an improved device in which the usual measuring tape case may be held and which will so coöperate with the measuring tape as to enable accurate measurements to be made and also to provide a means whereby circles may be scribed with great facility and accuracy. In taking measurements that are greater than a few feet, it is very important to introduce a more general use of some measuring device that is more desirable in the interest of accuracy and speed, than any of the ordinary foot rules and measuring tapes that are now available.

When establishing any measurement, say twenty or thirty feet, it becomes necessary to make several applications with the rule that may be used, in laying out the desired measurement. The many applications of any foot rule introduce too frequently a discrepancy in the measurement, as rarely will any two persons lay out any measurement, when many applications of a measuring rule are made, and obtain the same result. It is likewise true of the measuring tapes in common use, at the present time, and which cannot be used with absolute accuracy in taking measurements between certain points; as, for instance, between two walls of a room, or between any two points, when at least one edge may not be available. When measuring the distance between the two walls of a room with the present day tapes, one proceeds thus:—Apply the end of the tape against the face of one wall, then roll out the tape and move toward the opposite wall to apply the tape for measurement. If the tape be a steel tape, it can bend only into a curved form (not at right angles without breaking), it therefore becomes impossible to bring it into contact with the wall at the point of correct measurement that should be indicated on the tape. In taking such measurements, the operator must resort to his judgment to determine the point of measurement on the tape, as this point cannot be brought into contact with the face of the wall. Hence, the result, that the measurement taken is frequently unreliable and should not be recorded in connection with any work requiring accurate measurements. It is therefore one of the primary objects of my invention to provide a device whereby the beneficial uses of the steel, or other roll-up type of measuring tape may be kept and provision made to enable an accurate measurement to be taken by such tape and thus eliminate the objectionable features hereinbefore referred to.

Another object of the invention is to provide a device which can be sold as an article of manufacture independently of the steel measuring tape and used with any of the standard types of roll-up measuring tapes now on the market.

Again, the invention has for its object to provide a device of the character stated of a simple, inexpensive and effective construction whereby it can be sold with the usual measuring tape at a nominal additional expense.

The invention in its generic nature consists of a receptacle into which the measuring tape holder is designed to be set, the receptacle having an opening in its end through which the tape is adapted to project, and having provision for clamping the tape against longitudinal movement when desired to hold the measurement as long as the operator needs it, the case also having provision whereby it can be brought up in edge contact with the wall so that the measurement may be taken between the free end of the measuring tape and the opposite end of the case or holder in which the measuring tape case is set, provision also being made for a center pin whereby circles may be drawn with the device, if desired.

In its more detail nature, the invention includes those novel features of construction, combination and arrangement of parts, all of which will be first fully described, then be specifically pointed out in the appended claims and illustrated in the accompanying drawing, in which:—

Figure 1 is a perspective view of the invention.

Fig. 2 is a side elevation of the same.

Fig. 3 is a vertical section of the case, the measuring tape and its case being shown in elevation.

Fig. 4 is a horizontal section on the line 4—4 of Fig. 3, the measuring tape and its roll-up case being removed.

Fig. 5 is an end view of the case,

Fig. 6 is a diagrammatic view illustrating the manner in which the invention may be used for scribing circles.

In the drawing, in which like letters and numerals of reference indicate like parts in all of the figures, 1 is the holder or case, which is of general rectangular form in horizontal section and is designed to receive and hold, with retaining friction, the wind-up case 16 of the ordinary measuring tape. The holder 1 has a projection 2 at its rear end and a projection 3 at its front end. The tape 17 is cut off and the loop member 18 attached at such position as to compensate for the length of the base of the holder 1 between the extremes of the end projections 2 and 3 so that the amount of the tape 17 cut off will correspond to the length of the holder base whereby the precise reading may be taken from the edge of the projection 2 to the end of the tape 17 and read off directly on the tape.

The holder 1 has its upper side walls cut out as at 4 to expose the case 16 and permit free access to the winding-up appliance.

5 is an opening in the front wall of the case 1 just back of which there is provided an eccentric roller 7 that is mounted on a stud 6 and lies over a concavity 8 in the bottom wall of the case, the roller 7 having a pin hole 14 into which a pin 15 may be inserted and the roller turned down to clamp the tape 17 into the concavity 8 and thus hold it against accidental longitudinal movement, when desired. The bottom of the case 1, where the concavity 8 is provided, is formed with a slight projection 9 whereby the contact of the base of the holder 1, with the support on which it is pivoted for scribing purposes, is reduced to facilitate the pivotal movement of the same on the pin 12 as a center (see Fig. 6).

10 is an aperture in the rear wall of the holder 1 through which the centering pin 12 may be stuck into the cork retainer 11 when not in use (see Fig. 2) and the projection 2 has a pin hole 13 through which the pin 12 may be passed when the pin 12 is being used as a pivot.

In using my invention the end of the tape 17 is extended to one extremity of the measurement to be taken and the extreme end of the projection 2 is brought into engagement with the other extremity of the measurement to be taken and then the measurement is read off directly on the tape above the edge of the projection 3. The correct measurement is thus quickly ascertained and no allowance need be made for guesswork or error in judgment of the one using the device, as is necessary in the usual practice. After having placed the edge of the tape to one point and the edge of the holder to the other point, between which measurement is to be taken, the operator can turn the roller, either by finger or by use of a pin 15 (see dotted lines, Fig. 3) to clamp the tape and then read the scale at leisure.

In scribing circles, the operator turns the member 18 upward and holds it against the pencil with the point of the pencil against the end of the tape. This compensates for the location of the center of the aperture 13 away from the extreme edge of the projection 2 and enables a circle of accurate radius desired to be scribed, it being understood that in scribing circles the eccentric roller 7 is used to clamp the tape and hold it in fixed position with relation to the holder 1 and thus prevent it from pulling out. If desired the case 1 may be provided with inch and fractional graduations along the side of the holder to facilitate use of the device in measuring distances less than the length of the section of tape cut off and these graduations may be placed on either or both sides of the case, as may be found desirable.

From the foregoing description, taken in connection with the accompanying drawing, it is thought the complete construction, operation and advantages of my invention will be readily apparent to those skilled in the art.

What I claim is:—

1. A device of the character described comprising a holder adapted to receive the wind-up case of a measuring tape, said holder including a flat base, and having an opening in its front wall through which the measuring tape is designed to project, and an eccentric clamp roller mounted within the holder adjacent to said opening for holding the tape against movement.

2. A device of the character described comprising a holder adapted to receive the wind-up case of a measuring tape, said holder including a flat base, and having an opening in its front wall through which the measuring tape is designed to project, an eccentric clamp roller mounted within the holder adjacent to said opening for holding the tape against movement, said holder having a concavo-convex portion in its bottom wall beneath said roller.

3. A device of the character described comprising a holder consisting of a bottom, side walls and end walls, the bottom having a projection beyond one end wall, said projection being provided with a pin aperture, a measuring tape case held in said holder with retaining friction with the measuring tape lying on the bottom of the holder, said holder having an opening in one of its end walls through which said tape projects, substantially as shown and described.

4. A device of the character described comprising a holder consisting of a bottom, side walls and end walls, the bottom having a projection beyond one end wall, said projection being provided with a pin aperture, a measuring tape case held in said holder with retaining friction with the measuring tape lying on the bottom of the holder, said holder having an opening in one of its end walls through which said tape projects, the bottom of said holder having a concavo-convex portion adjacent to said opening which functions as a glide and an eccentric clamping roller mounted within said holder and above the concavity whereby the tape may be pressed into said concavity and gripped, substantially as shown and described.

5. A device of the character described, comprising a holder consisting of a bottom, side walls and end walls, the bottom having a projection beyond one end wall, said projection being provided with a pin aperture, a measuring tape case held in said holder with retaining friction with the measuring tape lying on the bottom of the holder, said holder having an opening in one of its end walls through which said tape projects, the end wall of said holder adjacent to said base projection having a pin aperture, and a pin adapted to be passed through either of said pin apertures, and means within the holder for holding the pin when projected into the case.

ALEXANDER McLEOD.